(12) United States Patent
Cottles et al.

(10) Patent No.: US 7,543,501 B2
(45) Date of Patent: Jun. 9, 2009

(54) SELF-CALIBRATING PRESSURE SENSOR

(75) Inventors: Vernon Michael Cottles, Maplewood, MN (US); Gregory Lawrence Wagner, Roseville, MN (US)

(73) Assignee: Advanced Research Corporation, White Bear Lake, MN (US)

( * ) Notice: Subject to any disclaimer, the term of this patent is extended or adjusted under 35 U.S.C. 154(b) by 0 days.

(21) Appl. No.: 11/589,326

(22) Filed: Oct. 27, 2006

(65) Prior Publication Data

US 2008/0041164 A1     Feb. 21, 2008

Related U.S. Application Data

(60) Provisional application No. 60/730,563, filed on Oct. 27, 2005.

(51) Int. Cl.
*G01L 7/08* (2006.01)
(52) U.S. Cl. ...................................... 73/715
(58) Field of Classification Search ................ 73/702, 73/703, 1.59, 715
See application file for complete search history.

(56) References Cited

U.S. PATENT DOCUMENTS 3,915,015 A * 10/1975 Crane et al. ............... 73/865.4
5,142,912 A * 9/1992 Frische ....................... 73/702
5,361,218 A * 11/1994 Tripp et al. .................. 702/88
6,374,191 B1   4/2002 Tsuchiya et al.
6,451,668 B1   9/2002 Neumeier et al.
7,131,334 B2 * 11/2006 Mei ............................ 73/715

* cited by examiner

*Primary Examiner*—Andre J Allen
(74) *Attorney, Agent, or Firm*—Dorsey & Whitney LLP; Nathan J. Witzany (57) ABSTRACT

The present invention is system and method for providing a self-calibrating pressure sensor. A pressure sensor apparatus comprises a diaphragm, at least one driving element operably coupled to the diaphragm configured to induce deflection in the diaphragm, and at least one strain gauge coupled to the diaphragm. The at least one strain gauge measures the deflection of the diaphragm. Typically, the driving elements will be piezoelectric drivers and will be operably coupled to the diaphragm. A method for evaluating a pressure sensor comprises inducing deflection in a diaphragm, measuring the deflection, determining the frequency-dependent response, calculating mechanical characteristics of the diaphragm from the frequency-dependent response, and calculating a response coefficient for the diaphragm based in part on said mechanical characteristics. The response coefficient is used to evaluate the sensor. The sensor can then be re-calibrated or self-calibrated based on the response coefficient.

13 Claims, 7 Drawing Sheets

SELF-CALIBRATING PRESSURE SENSOR

CROSS-REFERENCE TO RELATED APPLICATION(S)

This application claims priority to U.S. provisional patent application Ser. No. 60/730,563, filed Oct. 27, 2005, which is incorporated herein by reference in its entirety.

FIELD OF THE INVENTION

The present invention relates to a self-calibrating sensors that have their output electronically calibrated. More particularly, the present invention relates to a sensor having a diaphragm, at least one piezoelectric element coupled to the diaphragm configured to induce deflection in the diaphragm, and at least one piezoresistive element coupled to the diaphragm, wherein the at least one piezoresistive element measures the deflection of the diaphragm.

BACKGROUND OF THE INVENTION

In use, pressure sensors can drift in their calibration outside of their desired accuracy for the application. A sensor might also suffer partial or total failure. Diaphragm based pressure sensors are known to suffer from calibration drift over time. This can manifest as a calibration-slope drift or as a zero-pressure value drift. The causes are often specific to the application. Most calibration-slope drift problems are related to changes in the diaphragm's mechanical properties. Many sensors attempt to use very stable materials to avoid calibration drift, such as Silicon-on-Sapphire ("SOS"), which is a hetero-epitaxial process that consists of a thin layer of silicon grown on a sapphire ($Al_2O_3$) wafer. A source of zero-pressure value drift, is stress relief from the diaphragm mounting condition. Careful packaging is directed toward this problem. Compensation for temperature calibration offsets has been developed to a high degree, but little has been done to address changes in the mechanical properties of the diaphragm.

Building a very stable sensor based on careful selection of materials, careful mechanical design, and careful selection of processing techniques is admirable. Statistically, in a given critical application, it is still necessary, however, that the accuracy of the sensor be determined in-situ to allow confidence in the performance of the system in which it is embedded. This calibration is typically performed by attaching a known, external, reference pressure transducer in parallel to the sensor to be verified.

There are a number of causes for changes in the diaphragm's properties. Some examples include, but are not limited to, (1) annealing of the diaphragm material through temperature cycling or large temperature excursions, resulting in changes to the elastic modulus of the diaphragm, (2) etching of the diaphragm by the fluid being measured, resulting in a thinning of the structure and a change in diaphragm stiffness, (3) chemical reaction of the diaphragm with the fluid being measured, resulting in a change in the nature of the material on the pressure side, which might result in a composite structure with a different effective modulus and stiffness, and (4) deposition of material dissolved or suspended in the fluid being measured, resulting in a change in the nature of the material on the pressure side, which might result in a composite structure with a different effective modulus and stiffness.

There is a need in the art for a sensor that is capable of self-diagnosis and determination, self-calibration correction and confidence reporting without coupling to an external reference. If a sensor could self-determine the mechanical properties of the diaphragm for reasonable changes, it could correct the slope calibration and thus provide a longer service life with a stated accuracy. If the measured changes are larger than reasonable, the need for replacement could be detected in-situ. The present invention provides a sensor that could detect and correct for the first three cases mentioned above, and detect the fourth case. This would allow the sensor to effectively determine its own maintenance schedule, reducing the overall cost of maintenance and reliability for a system containing a number of such sensors. More importantly, it would help to identify sensors approaching degradation failure and thereby reduce overall down time for the system that would be caused by catastrophic failure of the sensor.

BRIEF SUMMARY OF THE INVENTION

The present invention provides a sensor that is capable of self-determining calibration drift and correcting its reported reading to the desired accuracy. The sensor is capable of detecting partial failure of the sensing element that cannot be corrected for, and reporting that condition.

The present invention, in one embodiment, is a pressure sensor comprising a diaphragm, at least one driving element operably coupled to the diaphragm, wherein the at least one driving element is configured to induce deflection in the diaphragm, and at least one strain gauge coupled to the diaphragm, wherein the at least one strain gauge measures the deflection of the diaphragm.

The present invention, in another embodiment, is a method for evaluating a pressure sensor, comprising inducing deflection in a diaphragm, measuring the deflection in the diaphragm, determining the frequency-dependent response of the diaphragm, calculating mechanical characteristics of the diaphragm from the frequency-dependent response, and calculating a response coefficient for the diaphragm based in part on the mechanical characteristics of the diaphragm, wherein the response coefficient is used to evaluate the sensor.

The present invention, in another embodiment, is a method for evaluating a pressure sensor, comprising creating fundamental modes of oscillation in a diaphragm using at least two driving elements, wherein a relative driving phase between the at least two driving elements controls the fundamental modes, calculating mechanical characteristics of the diaphragm from the fundamental modes, and calculating a response coefficient for the diaphragm based in part on the mechanical characteristics of the diaphragm, wherein the response coefficient is used to evaluate the sensor.

The sensor may be integrated into a wireless package for ease of implementation and replacement of outdated sensors. Due to its capabilities, manufactured sensors of this type can self-calibrate without the benefit of traditional calibration against a standard. These self diagnostic and determination capabilities provide better long-term system accuracy and targeted maintenance schedules, improving process efficiency, operational cost, and reliability.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. For example, the self-calibrating sensor and method of the present invention works with any dynamic method of measuring deflection of the diaphragm. Accordingly, the drawings and detailed description are to be regarded as illustrative in nature and not restrictive.

DETAILED DESCRIPTION

The present invention is a novel and advantageous self-calibrating sensor. The present invention can be applied to, for example, a self-calibrating pressure sensor, in which a deformation of a diaphragm can be detected and self-calibrated. Although the present invention is described herein with respect to a self-calibrating pressure sensor, the principles apply, in general, to other types of sensors used to measure physical quantities, such as, but not limited to, temperature, light intensity, radiation, force, position or other mechanical movements, such as vibration, sound, acceleration and rotation. The pressure sensor of the present invention may be used for, but not limited to, medical equipment, HVAC equipment, process controls, industrial machinery, pumps, robotics, etc.

Generally, the category of pressure sensors considered here, are constructed of a flexible diaphragm with strain gauges bonded to, or diffused into, it, acting as resistive elements. As the pressure differential increases between the faces of the diaphragm, the diaphragm will flex. The deflection, or amount of displacement of the diaphragm, causes the resistive values of the strain gauges to change and is measured. The system is then calibrated, such that a given defection of the diaphragm, as measured by the output of the strain gauges, corresponds to a given pressure. The amount of deflection, for a given geometry of the diaphragm, is determined by the elastic modulus and the Poisson ratio of the diaphragm material. Any change in these mechanical properties, such as the four changes listed previously, will cause a deviation in the deflection of the diaphragm corresponding to its original calibration. What is needed for a sensor that is capable of diagnosing and recalibrating itself, is a means of self-determining its own mechanical deformation properties.

The material properties that determine a diaphragm's deflection characteristics also determine resonance characteristics. A simple example would be that of a drum head. The present invention includes an AC, or dynamic response in the sensor system, to measure its resonance characteristics. Particularly, one could measure the resonant response of the system by launching forced acoustical waves into the sensor diaphragm.

Figure 1:
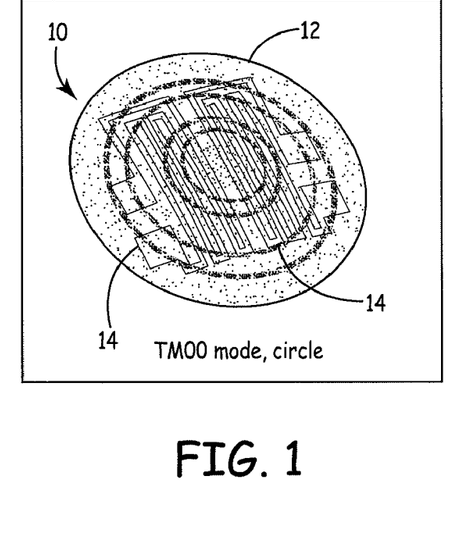
FIG. 1 is a FEA model of a $TM_{00}$ non-degenerate, fundamental resonant mode for a circular diaphragm in accordance with one embodiment of the present invention.

With reference to FIG. 1, a Finite Element Analysis ("FEA") model 10 for the $TM_{00}$ (nomenclature discussed, infra) non-degenerate, fundamental resonant mode of a circular diaphragm 12 is provided. As can be seen from FIG. 1, two strain gauges 14 are mounted on the diaphragm (seen as wire frame overlay). Proper placement of the strain gauges 14 on the diaphragm allows a distinguishable measurement of the fundamental resonant modes. In one embodiment, the strain gauges 14 are mounted symmetrically about the central node of the circular diaphragm 12 and are capable of resolving the resonant displacement. With proper symmetric placement, the strain gauges 14 will cycle through compression and tension in phase.

Figure 2:
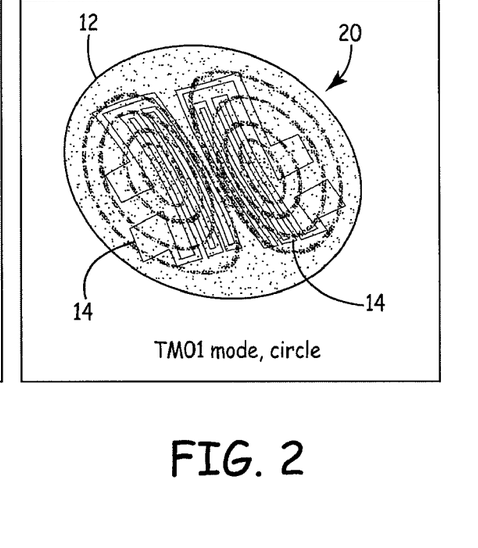
FIG. 2 is a FEA model of a $TM_{01}$ non-degenerate, fundamental resonant mode for a circular diaphragm in accordance with one embodiment of the present invention.

With reference to FIG. 2, a FEA model 20 for the $TM_{01}$ non-degenerate, fundamental resonant mode of circular diaphragm 12 is provided. The strain gauges of the $TM_{01}$ mode will cycle through compression and tension one hundred eighty degrees (180°) out of phase.

Figure 3:
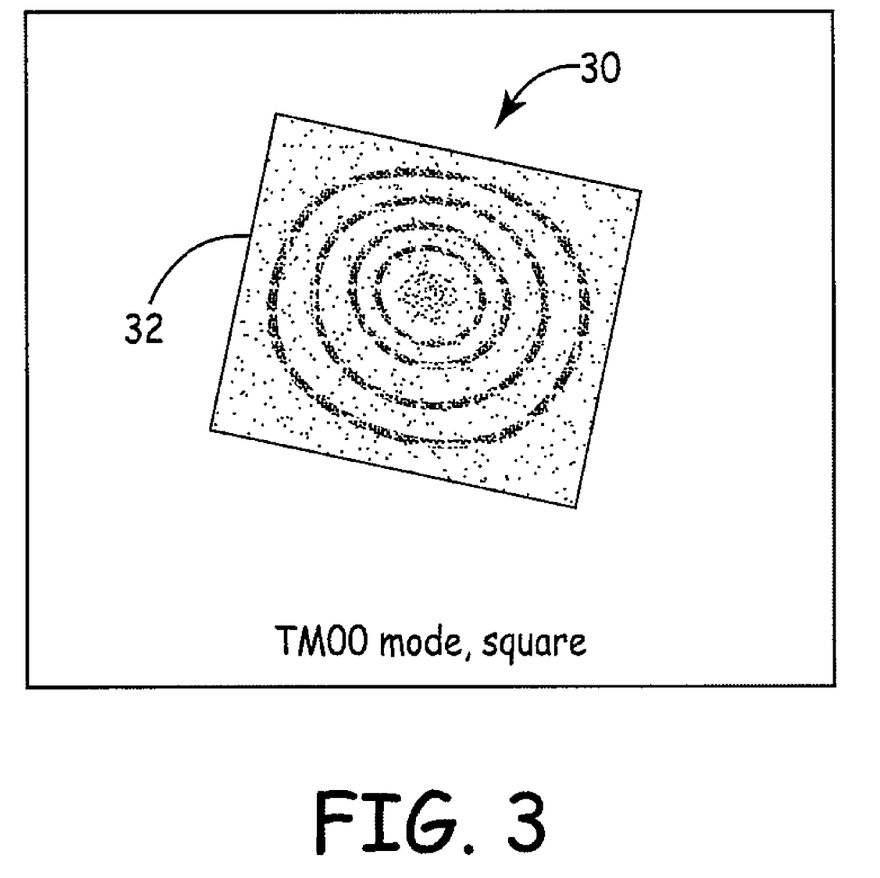
FIG. 3 is a FEA model of a $TM_{00}$ non-degenerate, fundamental resonant mode for a square diaphragm in accordance with one embodiment of the present invention.

The shape and frequency of the fundamental resonant modes are geometry dependent. That is, the diaphragm 12 need not be circular. With reference to FIG. 3, for example, a FEA model 30 for the $TM_{00}$ non-degenerate, fundamental resonant mode of a square diaphragm 32 is provided, where compression and tension are in phase. Similarly, the geometry of the diaphragm may be any shape as desired, including, but not limited to, circular, elliptical, square, rectangular, triangular, or polygonal.

In one embodiment, a sensor would consist of a diaphragm, a strain gauge bridge, and a set of piezoelectric blocks. The piezoelectric blocks would be energized to induce forced vibrations in the sensor diaphragm. The strain gauges, used in AC mode, would measure the resulting deflection, and the characteristic resonant frequencies would be determined. A change in the frequency of the fundamental vibrational modes would then determine the change in the deflection calibration of the sensor.

Figure 4:
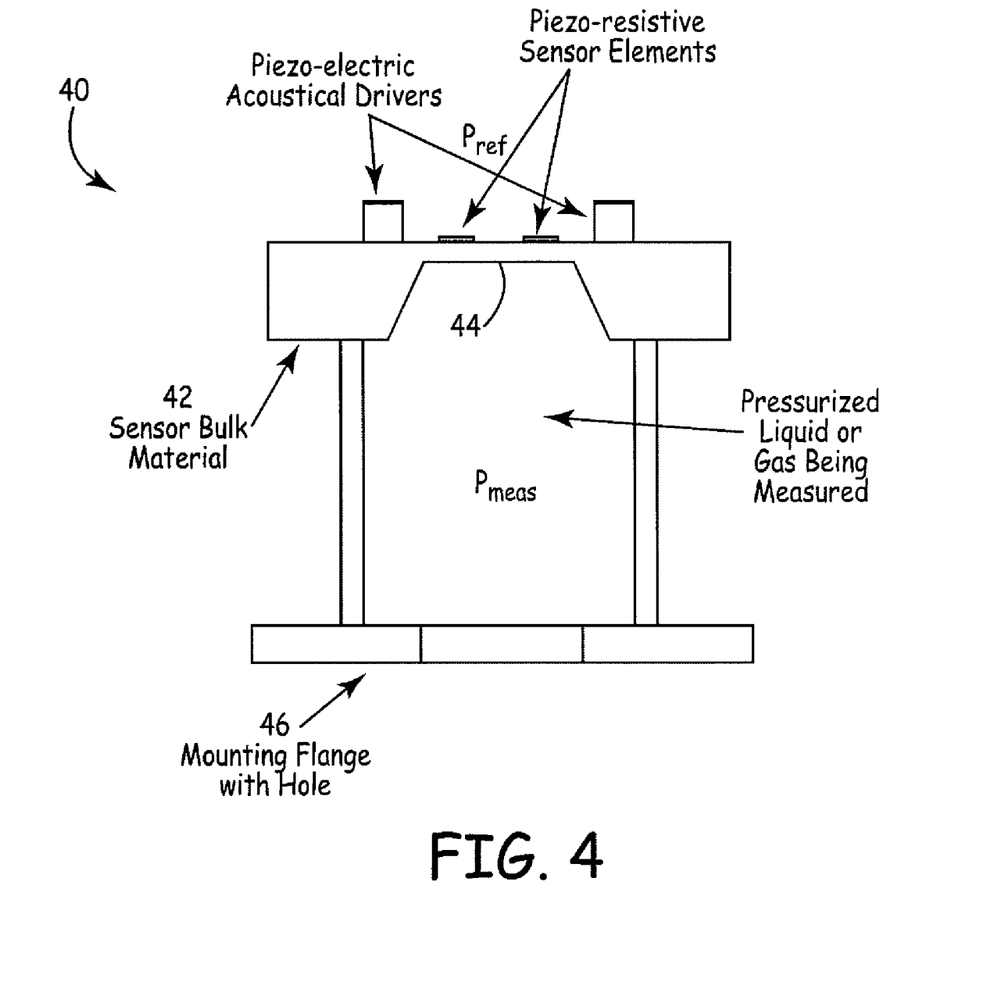
FIG. 4 is a side schematic view of a pressure sensor in accordance with one embodiment of the present invention.

With reference to FIG. 4, one embodiment of a sensor 40 is described in further detail. The sensor 40 comprises bulk sensor material 42. The bulk sensor material 42 has a cavity etched into it, leaving a thin, circular diaphragm 44 that can flex. More particularly, the diaphragm 44 deforms when a difference in pressure exists on the two sides of the diaphragm 44. The area above the sensor 40 is at a reference pressure ($P_{ref}$ in FIG. 4). The area below the sensor 40 is coupled to the pressure being measured ($P_{meas}$). To prevent modification to the sensing diaphragm 44, in one embodiment, there is a highly compressible fluid isolation diaphragm (not shown) interposed between the mounting flange 46 and the sensing diaphragm 44. The bulk sensor material 42 of the sensing diaphragm 44 is chosen for performance of the sensor 40. The material of the isolation diaphragm is chosen for resistance to deterioration from exposure to the gas or liquid whose pressure is being measured.

Mounted on the top surface of the diaphragm is at least one piezoelectric element and at least one piezoresistive element. In one embodiment, with reference to FIG. 5, wherein a top view of the sensor 40 is shown, the sensor 40 includes five piezoresistive elements, resistors 52-56, and two piezoelectric elements, acoustical drivers 57 and 58. Resistors 52-55 form a bridge circuit with resistors 53 and 54 opposed to form a full sensing bridge for maximum sensitivity to deflection of the diaphragm 44. Current sensing resistor 56 monitors the total bridge current.

Figure 6:
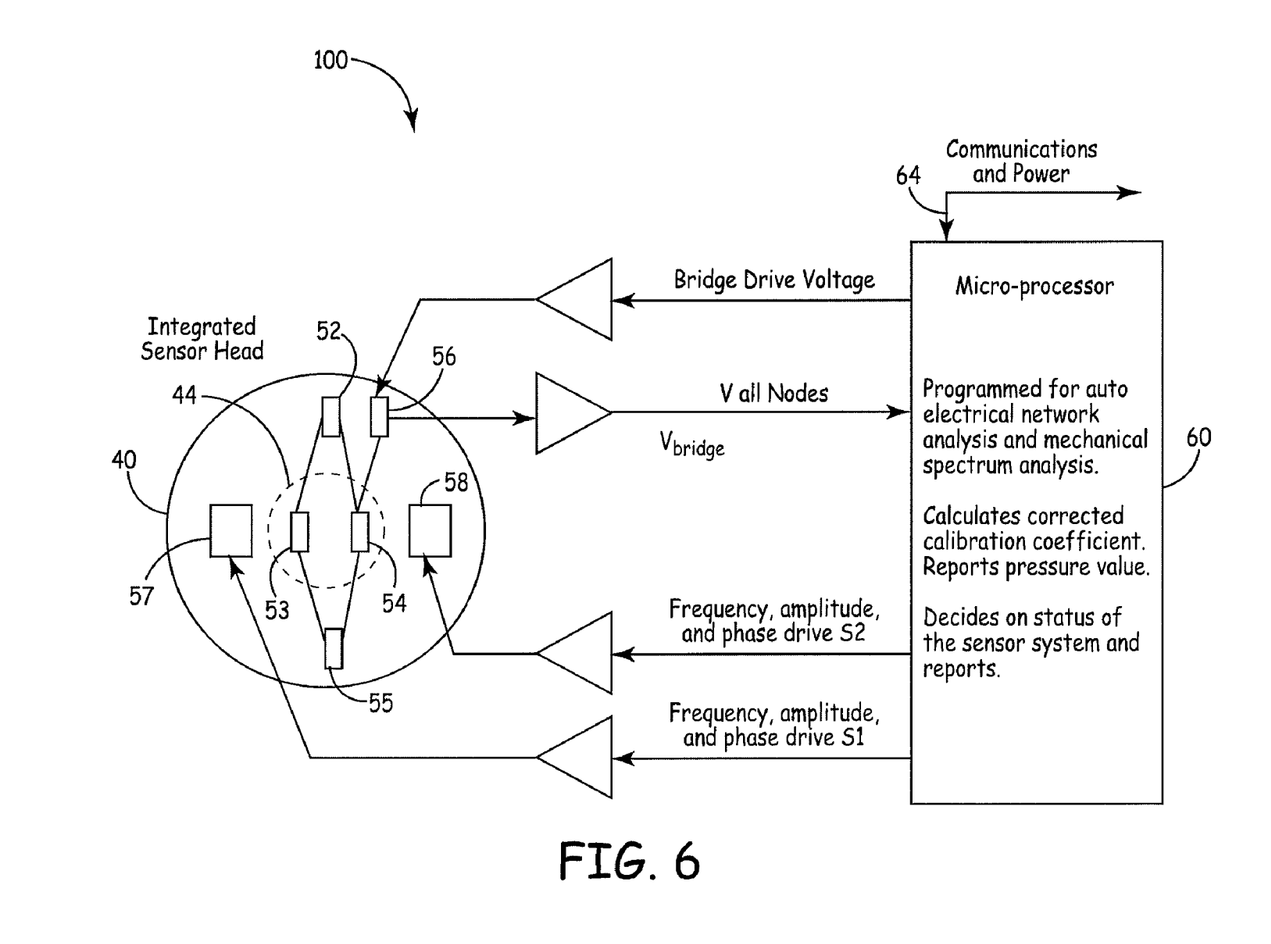
FIG. 6 is a schematic diagram of a pressure sensor system in accordance with one embodiment of the present invention.

FIG. 6 is a schematic diagram of a further embodiment of a sensor system 100 of the present invention. Typically, the unit is manufactured using a semiconductor manufacturing process. Some hybrid circuit technology may also be employed. The sensor system 100 includes a sensor 40 having a diaphragm 44, piezoresistive elements 52-56, and piezoelectric elements 57 and 58. The sensor system 100 further includes a microprocessor 60 programmed for automatic electrical network analysis and mechanical spectrum analysis. The microprocessor 60 calculates the corrected calibration coefficient and reports the pressure value. Additionally, the microprocessor 60 determines the status of the sensor system 100, e.g., whether a soft or catastrophic failure has occurred, and reports the status. The microprocessor includes a communication input/output ("I/O") line 64.

Figure 8A:
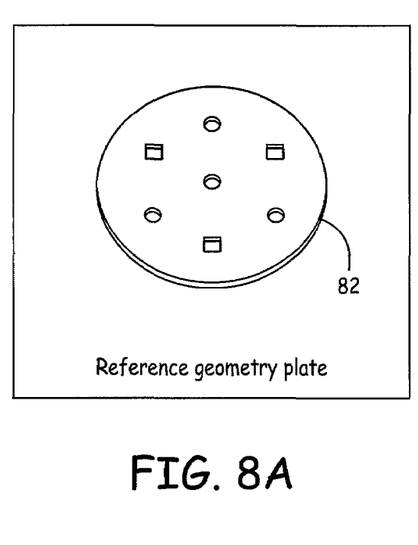
FIG. 8A is a top perspective view of a reference geometry plate in accordance with one embodiment of the present invention.
Figure 8B:
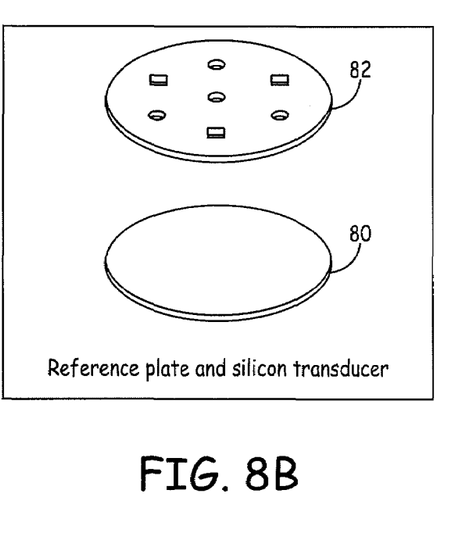
FIG. 8B is a exploded perspective view of a reference geometry plate and silicon wafer in accordance with one embodiment of the present invention.

One requirement for modal excitation is proper boundary conditions. One embodiment of the present invention is shown in FIGS. 8A and 8B. A three inch silicon wafer 80 is processed for the deposition of strain gauges and fiducial alignment markers for the piezoelectric elements. A mating geometry reference plate 82 is machined out of stainless steel, or any other suitable material, and bonded to the front side of the silicon wafer 80. The geometry reference plate 82 may contain four round holes and three square holes, thus creating four round diaphragms and three square diaphragms when bonded to the silicon wafer 80. The number and arrangement of the square and round holes is for illustration purposes only and is not limiting. Any number of round and/or square holes may be arranged in any fashion, as desired. Similarly, as previously discussed, the holes are not restricted to squares and circles, but may be of any geometry.

An electric amplifier suite would be integrated to allow high impedance measurement of all appropriate DC and AC signals. The assembly would be designed to minimize electronic and microphonic noise. The amplifier outputs would be directed to appropriate analog-to-digital converters (ADCs) for computer capture of the data. A program would be generated to capture data and format it for bulk processing by analysis programs. The system will then be integrated with the sensor 40.

In one embodiment of the present invention, the sensor further comprises wireless components. As such, true remote sensing may be accomplished, such that the sensor would not need to be coupled to an external system.

Computer code automatically self-calibrates the sensor 40 using appropriate algorithms. The computer code has the ability to detect calibration shift and take appropriate action by self calibrating, warning of "severe" degradation, calling a soft failure, or calling a catastrophic failure.

Referring back to FIG. 6, by monitoring the voltage at each node in the bridge network, it is possible to use standard electrical circuit theory, i.e., node/loop mesh analysis, to deduce all resistor values on the sensor structure. This analysis may further provide the temperature of the structure as a very useful by-product. Any variation of resistance from nominal original values could be used to detect plastic deformation, or other permanent changes, of a resistive element. It would then be possible to correct the electrical network calibration, if the specific elements did not fail catastrophically. If too many elements are out of range, a soft failure can be reported. If an element becomes open or shorted, a catastrophic failure can be reported. Additionally, drift of the parameters can be reported to alert pending calibration failure.

The two piezoelectric elements 57 and 58 are mounted to the bulk sensor material 42 (shown in FIG. 5) or the diaphragm 44 in a way that allows introduction of a transverse to the plane of the diaphragm 44 wave excitation. By driving these units with a variable frequency oscillator, the spectral response of the diaphragm 44 can be measured. The radial solution of the diaphragm deflection may be represented by Bessel functions, and the polar angular solution may be represented by sine/cosine functions. The modes of resonant vibration can be labeled as $TM_{xy}$, where 'x' is the order of the Bessel function and 'y' is the order (harmonic) of the sine/cosine function. By varying the frequency and phase of the excitation to piezoelectric elements 57 and 58, it is possible to accurately determine the frequency for the $TM_{00}$ and $TM_{01}$ modes of the system. The frequencies depend on the temperature dependent modulus of the diaphragm 44, its thickness, and its diameter. Sufficient information can be obtained from these measurements to accurately determine the mechanical response characteristics of the diaphragm and hence give the deflection coefficient for the diaphragm 44.

Figure 5:
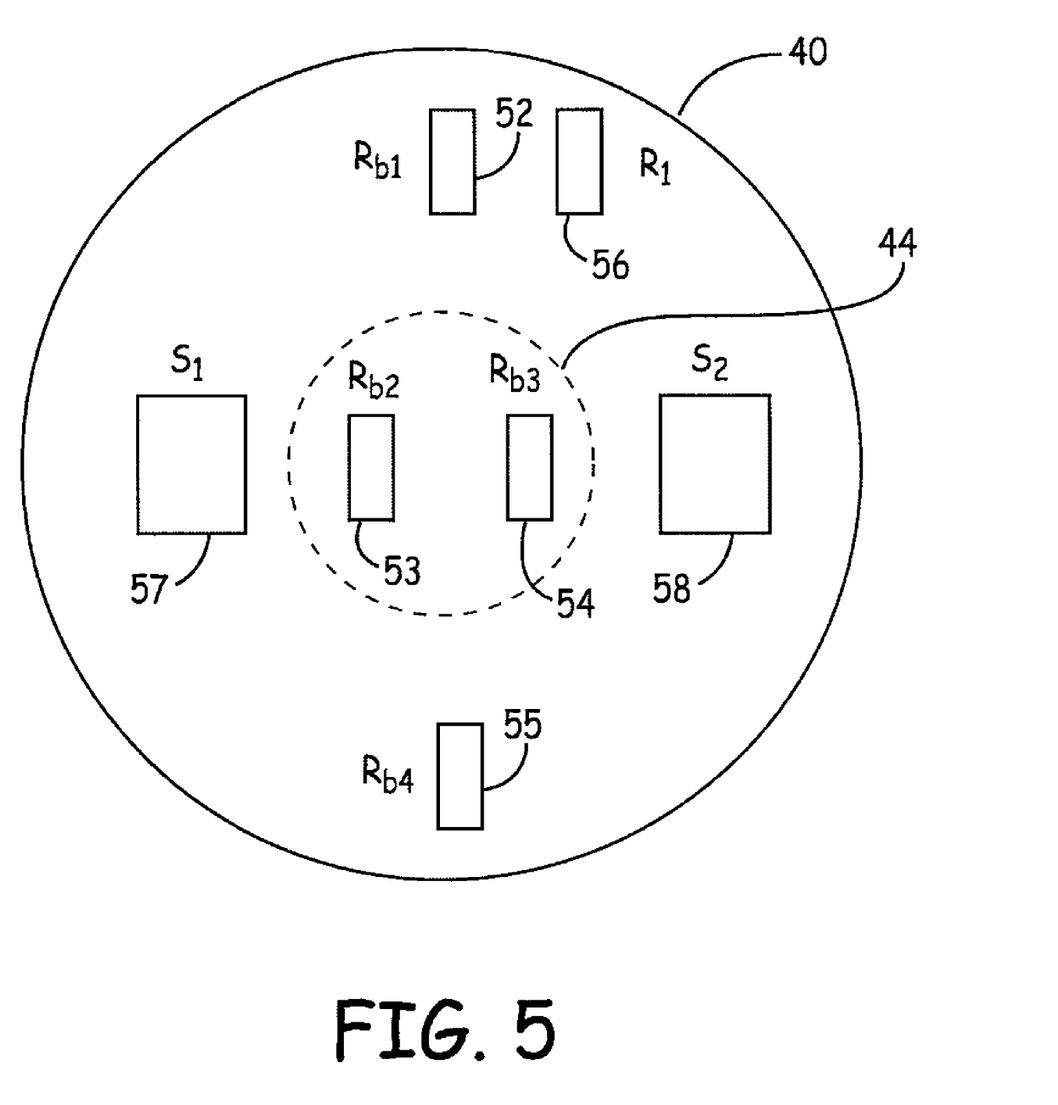
FIG. 5 is a top schematic view of a pressure sensor in accordance with one embodiment of the present invention.

As previously stated, by measuring the voltages at all nodes, it is possible to calculate the nominal values of all resistive elements 52-56 in the bridge. Typically, one resistor, for example, current sensing resistor 56, is very robust and substantially temperature independent for analysis. Current sensing resistor 56 need not be manufactured of identical material as the actual bridge resistive elements 52-55. A separate differential instrumentation amplifier would provide the true bridge output for pressure determination.

In one embodiment, an example of the analysis is provided with consideration of two basic equations given for properties of diaphragm pressure sensors. For the signal, which represents the degree of static deflection of the diaphragm for a given system:

$$\text{Signal} = \frac{-3PR^2(1-v^2)}{4t^2 E}$$

Where P is pressure, R is the effective radius of the diaphragm 44, v is the Poisson ratio, t is the thickness of the diaphragm 44, and E is the elastic modulus. For the resonance frequencies of different vibrational modes of the diaphragm 44:

$$\text{Frequency}_i = \left(\frac{K_i t}{R^2}\right)\sqrt{\left(\frac{E}{\rho(1-v^2)}\right)}$$

Where the P, R, v, t, and E are defined similarly as above, but additionally, $K_i$ is the dimensionless constant determined by mode, and $\rho$ is the diaphragm 44 material mass density. The actual frequency will depend on the stress in the membrane induced by the application of pressure, which would, therefore, require a recursive solution for the unstressed frequency, which is given by the above equation.

By measuring the frequencies of different modes, it is possible to deduce drifts in the quantity:

$$\frac{t^2 E}{1-v^2}$$

which is the key mechanical factor in the Signal calibration equation. Any small shift from initial values can be used to correct the calibration coefficient and preserve the accuracy of the sensor. Serious changes indicating plastic deformation or fatigue cracking of the diaphragm 44 can be used to alert for soft failures. Catastrophic full cracking of the diaphragm 44 can be detected and reported.

At least two methods may be used to determine the resonant frequencies. It is recognized, however, that there are many other methods of determining the resonant frequencies. Under the first method, the piezoelectric elements 57 and 58 would be driven in-phase, and frequency swept through the $TM_{00}$ resonance frequency. The resonance frequency would be determined by measuring the AC signal across the diaphragm piezoresistive bridge element. The piezoelectric elements 57 and 58 would then be driven out-of-phase, and frequency swept through the $TM_{01}$ resonance frequency. Again, the resonance frequency would be determined by measuring the AC signal across the diaphragm piezoresistive bridge element. The information obtained would be sufficient to correct the calibration coefficient. That is, the information obtained would determine the quantity $$\frac{t^2 E}{1-v^2}$$

and hence, allow correction to the calibration coefficient.

Under the second method, the piezoelectric elements 57 and 58 would be driven in-phase, using the AC signal across the diaphragm piezoresistive bridge element as the feedback source through an appropriate amplifier. The amplifier would incorporate a band-pass filter centered on the nominal $TM_{00}$ resonance frequency. The resonance value would then be determined by measuring the resulting frequency. Also, one piezoelectric element would be driven, using the AC signal across the diaphragm piezoresistive bridge element as the feedback source through an appropriate amplifier. The amplifier would incorporate a band-pass filter centered on the nominal $TM_{01}$ resonance frequency. The resonance value would then be determined by measuring the resulting frequency. Again, this information would be sufficient to determine the quantity described above and allow correction to the calibration coefficient.

A sample set of characteristics for a silicon based diaphragm sensor is given in the table below.

| P = pressure | 103350 | Pascal (15 psi) |
|---|---|---|
| R = radius | 5.00E−03 | Meters |
| υ = Poisson ratio | 0.285 | — |
| t = thickness | 2.00E−04 | Meters |
| E = modulus | 2.07E+11 | Pascal |
| ρ = density | 7.83E+03 | Kg/meter³ |

Using these values, the deflection for a given pressure can be calculated from first order equations that are widely known. The resonance frequency can also be calculated. The sample given considers the changes in the diaphragm's mechanical response for changes in elastic modulus, Poisson ratio, or the thickness of the diaphragm 44. In this sample, a pressure of 15 psi (103350 Pa) is used. It will be recognized that other pressures may also be used.

Figure 7:
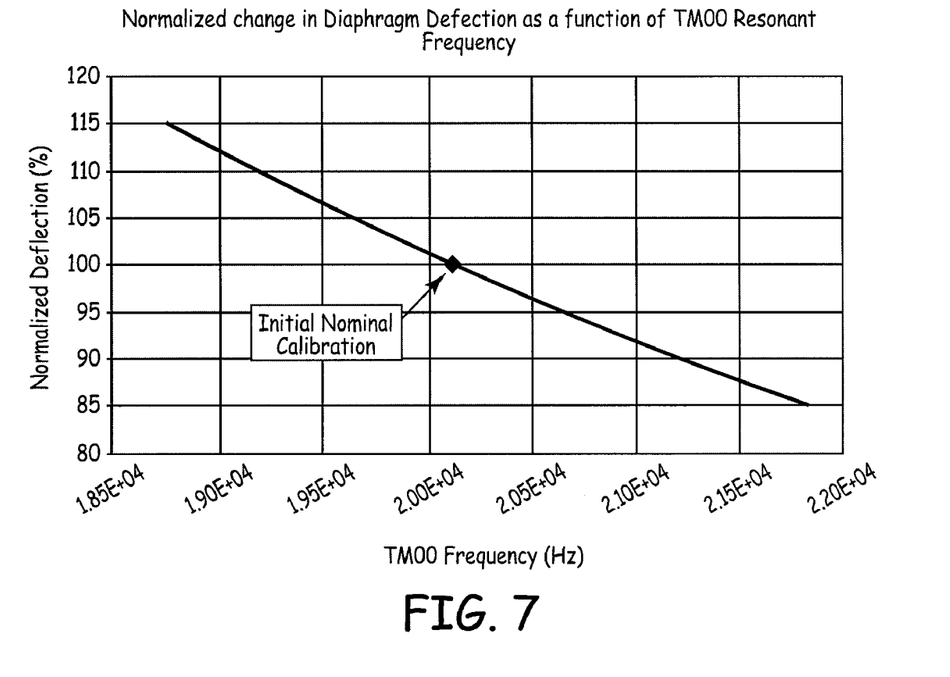
FIG. 7 is a graph of the normalized change in diaphragm deflection as a function of $TM_{00}$ resonant frequency in accordance with one embodiment of the present invention.

FIG. 7 is a graph that compares the change in the sensor diaphragm deflection versus the sensor diaphragm resonance frequencies, for a fixed value of pressure. As can be seen, the deviation in diaphragm deflection for changes in elastic modulus, Poisson ratio, or the thickness of the diaphragm 44, i.e., $(1-v^2)/Et^2$, corresponds to a shift in the resonance frequency. In particular, for the example given here, a 1% deviation in the diaphragm deflection corresponds to approximately a 160 Hz frequency shift in the $TM_{00}$. A similar model shows the $TM_{01}$ mode will shift approximately twice the amount of the $TM_{00}$ mode. Thus, a measurement of drift in the resonance characteristics of the diaphragm, provides a means of correcting the diaphragm displacement calibration.

As previously discussed, the equation used to generate the graph is for the unstressed (zero pressure) resonant frequency. In practice, calibration under pressure would require the use of the raw pressure reading to model the stressed resonant frequency. It may require a recursive calculation to achieve maximum accuracy.

For the first three of the four cases for sensor calibration failure described previously, the correction would take the form of a calibration change given by:

$$P = C\Delta(V_{bridge})$$

$$C = C_0 + a(f-f_0) + b(f-f_0)^2 + c(f-f_0)^3 +$$

Where P is defined similarly as above, $V_{bridge}$ is the voltage across the piezoresistive bridge, C is the calibration coefficient, $C_0$ is the first order calibration coefficient (native or unmodified), a, b, and c are calibration constants, and f and $f_0$ are changes in resonant frequency. This process would be done for the $TM_{00}$, $TM_{01}$, and possibly more modes to verify the nature of the change. For the example shown here, the equation for the calibration coefficient is:

$$C = C_0 + 9.94\ 10-3(f-f_0) +$$

Where 9.94 10−3 is a calibration constant for the sample silicon based diaphragm sensor, for which the characteristics are provided above.

For the fourth case, the change in frequency would be detected, but it would require a measurement of the recognized metric of the resonant characteristics (Q) of the system or (to be experimentally determined) a different magnitude effect on the higher modes to differentiate it from the first three cases. If not correctable, sensor soft failure would be reported.

Although the present invention has been described with reference to preferred embodiments, persons skilled in the art will recognize that changes may be made in form and detail without departing from the spirit and scope of the invention.

We claim:

1. A method for evaluating a pressure sensor, comprising:
   inducing deflection in a diaphragm;
   measuring the deflection in the diaphragm;
   determining the frequency-dependent response of the diaphragm;
   calculating mechanical characteristics of the diaphragm from the frequency-dependent response; and
   calculating a response coefficient for the diaphragm based in part on the mechanical characteristics of the diaphragm, wherein the response coefficient is used to evaluate the sensor.

2. The method of claim 1, wherein determining the frequency-dependent response of the diaphragm comprises determining the resonant frequencies in the diaphragm.

3. The method of claim 1, wherein determining the frequency-dependent response of the diaphragm comprises, determining decay of characteristic frequency modes of the diaphragm.

4. The method of claim 1, wherein piezoelectric drivers that are operably coupled to the diaphragm are used to induce deflection in the diaphragm.

5. The method of claim 4, wherein inducing deflection in a diaphragm comprises inducing deflection in a diaphragm with a self-resonating oscillation loop.

6. The method of claim 1, wherein determining the frequency-dependent response of the diaphragm further comprises determining fundamental modes of oscillation of the diaphragm with at least one strain gauge strategically placed on the diaphragm.

7. The method of claim 1, wherein the geometry of the diaphragm is such that it promotes specific frequency responses of the diaphragm.

8. The method of claim 1, further comprising re-calibrating the sensor.

9. The method of claim 1, further comprising self-calibrating the sensor.

10. The method of claim 1, further comprising determining the operable functionality of the sensor.

11. The method of claim 10, further comprising detecting failure of the sensor.

12. A method for evaluating a pressure sensor, comprising:
creating fundamental modes of oscillation in a diaphragm using at least two driving elements, wherein a relative driving phase between the at least two driving elements controls the fundamental modes;
calculating mechanical characteristics of the diaphragm from the fundamental modes; and
calculating a response coefficient for the diaphragm based in part on the mechanical characteristics of the diaphragm, wherein the response coefficient is used to evaluate the sensor.

13. The method of claim 12, wherein the at least two driving elements are piezoelectric drivers.

* * * * *